March 12, 1968  E. SCHILLMANN ET AL  3,373,336
SEMICONDUCTOR-RECTIFIER DEVICE FOR HIGH-VOLTAGE
AND HIGH-FREQUENCY
Filed March 22, 1965  2 Sheets-Sheet 1

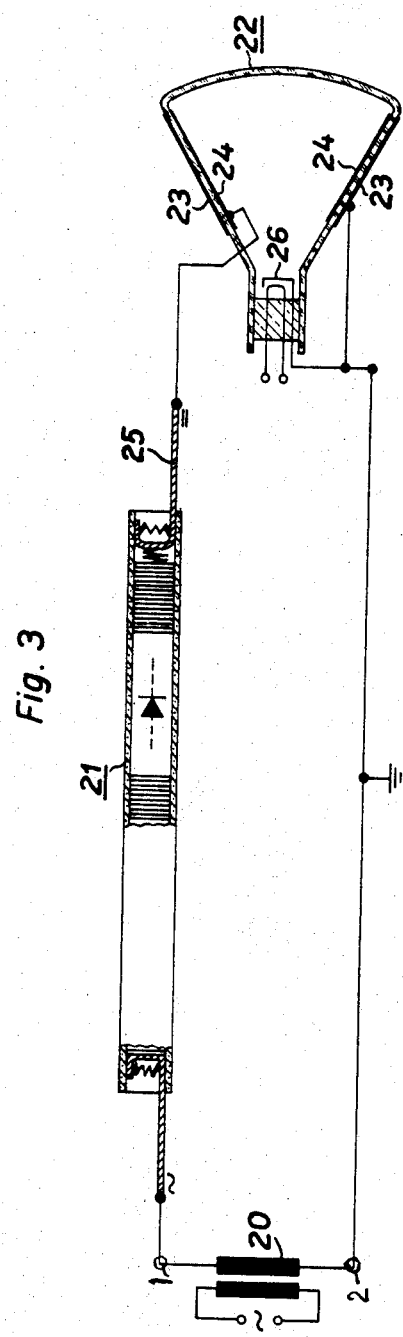

United States Patent Office 3,373,336
Patented Mar. 12, 1968

3,373,336
SEMICONDUCTOR-RECTIFIER DEVICE FOR HIGH-VOLTAGE AND HIGH-FREQUENCY
Ekkehard Schillmann, Heinz Eggert, and Reinhard Schatz, Berlin, Germany, assignors to Siemens Aktiengesellschaft, Munich, Germany
Filed Mar. 22, 1965, Ser. No. 441,460
Claims priority, application Germany, Mar. 25, 1964, S 90,191
3 Claims. (Cl. 321—11)

ABSTRACT OF THE DISCLOSURE

In a high voltage high frequency rectifying circuit for voltages above 5 kv. and frequencies above 10 kc., a rectifier connecting a voltage supply source to the DC output terminals comprises a column of semiconductor rectifier members stacked upon each other. Each of the rectifier members has an active rectifying area which is $\frac{1}{100}$ to $\frac{1}{4}$ of its total surface. The number of semiconductor rectifier members is so small that the blocking losses of the rectifier are of substantially the same order of magnitude as the forward losses.

---

Our invention relates to devices for rectifying alternating voltages of high-voltage and high-frequency.

In television receivers, the high-voltage for accelerating the electron beam of the picture tube, amounting to approximately 10 to 20 kv., is usually obtained by rectification of alternating voltage from the horizonal output transformer, this being a transformer which supplies voltage for the horizontal deflection of the scanning point on the picture screen. The voltage from the horizontal output transformer has a frequency of about 16 kilocycles per second. Since this voltage greatly departs from the sinusoidal shape and consequently possesses a very high content of upper harmonics, the effective frequencies involved in the rectification may amount up to about 100 kc. Using an alternating voltage of such a high frequency for producing the acceleration voltage has the advantage that only a slight amount of equipment is needed for transforming the voltage and for smoothing the rectified voltage. Diode tubes have been heretofore employed as high-voltage rectifiers for this purpose. It has long since been attempted to replace such tubes by semiconductor high-voltage rectifiers, for example rod-shaped assemblies of selenium rectifier elements connected in series. As a rule, however, the rectifier elements near the alternating-voltage terminal are soon damaged by overload phenomina. As will be explained with reference to FIG. 1 of th accompanying drawings, damage is basically due to the stray capacitance of the rectifier relative to its environment.

In the drawings:

FIG. 3 is a circuit diagram of a rectifier device according to the invention applied to a television picture tube.

Figure 1:
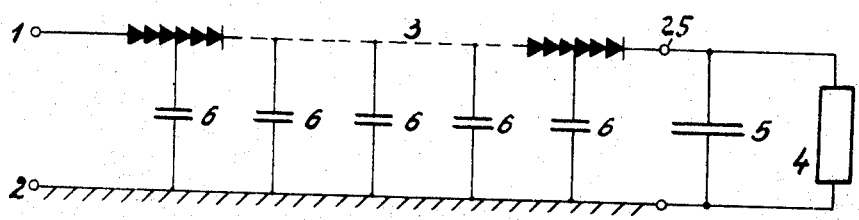
FIG. 1 is a circuit diagram of a high-voltage, high-frequency rectifying device of the type involved in the present invention.

According to FIG. 1 the terminals 1 and 2 of a high-voltage transformer are connected to a load 4 through a semiconductor rod-type rectifier column 3, a smoothing capacitor 5 being connected parallel to the load. Between the rectifier column 3 and the environment there exists a stray capacitance which may be imagined to be formed of partial capacitance 6 distributed along the column 3. At the above-mentioned high frequencies in the order of magnitude of 10 kc., considerable displacement currents flow through these stray capacitances and impose an additional load upon the individual rectifier elements of the column 3, particularly upon the elements in the vicinity of the alternating voltage terminal 1. This is tantamount to the fact that the alternating potential along the column 3 does not decline uniformly along the column but exhibits an initally steep voltage drop in the vicinity of the terminal 1 and declines toward the load at an increasingly shallower gradient.

The foregoing considerations are in accordance with those explained in the German Patent 1,064,642 which describes a selenium rectifier column for alternating currents of high voltage and high frequency in a design intended to eliminate the above-mentioned deficiencies. For this purpose the German patent discloses a rectifier column whose alternating-voltage input terminal is connected with a bell-shaped skirt which extends over the column toward the direct-voltage terminal and widens towards the latter. The skirt forms partial capacitances with respect to the individual points along the rectifier column, these capacitances decrease in the direction toward the direct-voltage terminal so as to obtain a more uniform distribution of the potential in the longitudinal direction of the column. This requires a skirt structure of considerably much larger width than the rectifier column itself and also extends the spacial range and volume where the maximum voltage obtains, thus aggravating the insulation requirements.

It is an object of our invention to provide a simpler and more compact rectifying device satisfactorily solving the problem of minimizing or virtually avoiding damage at the high-potential elements of the multi-element column for operating at extremely high voltages and high frequencies.

According to the invention, we connect the alternating-voltage supply, such as the horizontal output transformer of a television receiver, having a voltage above 5 kv. and a frequency above 10 kc., with direct-voltage output terminals through a columnar stack of semiconducting rectifier members whose respective active rectifier areas amount to only a slight fraction, namely $\frac{1}{100}$ to $\frac{1}{4}$, of the total surface area of the member.

Rod-type rectifier columns of this type are known as such (German Patent 974,772) for purposes requiring the members of a column to be subjected to high mechanical pressure while limiting the amount of reverse current.

The invention is predicated upon the concept that the influence of the stray capacitances upon the loading imposed upon the individual tablet members of the rectifier stack can be minimized or virtually suppressed by operating the rectifier tablets with a relatively high inverse voltage, that is under conditions where they are subjected to and must withstand a higher peak inverse voltage than heretofore applied to such rectifier stacks.

If with a given number of rectifier members within the stack, the rated blocking voltage at the terminals of the column is increased, then the rate of blocking voltage of all of the tablets is increased approximately uniformly whereas the additional loads imposed upon some of these members by the above-mentioned stray capacitances of the column remain unaffected. The total effect of an increase in rated blocking voltage therefore is to modify the potential drop along the column toward uniformity. A higher blocking voltage of the individual tablets, however, is tantamount to an increase in blocking losses, which must be dissipated in form of heat. The dissipation of these increased losses is made possible by virtue of the invention in that the tablets of the rectifier stack being used are only partially contacted. That is, the active rectifying area of each rectifier tablet is small in comparison with the geometric total surface. Consequently, the heat losses occurring in the small active rectifying zones are more readily dissipated through the comparatively very large surfaces and marginal portions of each tablet.

In a column having the rectifier tablets placed directly in face-to-face contact with each other, the tablets located in the middle of the column dissipate their heat losses mainly through the cylindrical peripheral surface areas. The closer the tablets are to the ends of the column, the more preponderant is the heat dissipation through the planar faces in the direction of the column axis. This is particularly significant to the particularly endangered tablets in the vicinity of the alternating-voltage terminal of the column. It is therefore essential to employ tablets in which the peripheral margin as well as the planar surfaces are very much larger than the areas of the active rectifying region. Preferably employed are tablets of circular shape having a centrally located active region, the diameter of the active region to the outer diameter of the tablet having the approximate ratio 1:3 so that the corresponding areas have a ratio of approximately 1:10.

It may appear, contrary to the foregoing considerations, that tablets having a relatively small active area, cannot have a better heat dissipation than tablets of the same size whose active area coincides with their total surface area. If this were correct, the above-mentioned partially contacted tablets could be replaced by fully contacted tablets. This, however, is not possible. A fully contacted tablet would conduct a blocking current increased in accordance with the increase of its active area, so that the ratio of the power loss to the heat-dissipating surfaces would be detrimentally increased.

Figure 2:
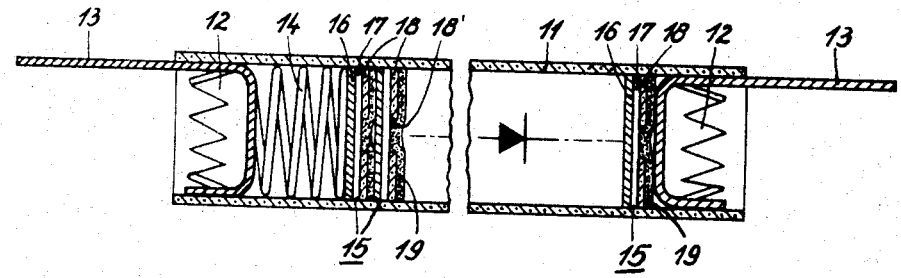
FIG. 2 shows a rod-shaped column of rectifier pellets employed for the purposes of the invention.

The rectifier column applicable for the purpose of the invention, is shown in FIG. 2 on enlarged scale.

The column comprises a cylindrical tube 11 of insulating material closed at both ends by cup-shaped closures 12 whose edges have teeth of some resiliency curved outwardly so that they dig into the material of the tube 11 after the closures are placed in the tube. The cups 12 have extension strips 13 which constitute the terminals of the column. Located adjacent to one of the closures is a helical compression spring 14. The rectifier column proper is composed of selenium rectifier tablets 15 stacked upon each other. Each tablet 15 is circular and comprises a carrier electrode 16, for example of aluminum, a selenium coating 17 on the carrier electrode, an insulating layer 18 with a central opening 18', and a cover electrode layer 19. The cover electrode 19 is in contact with the selenium coating 17 only through the opening 18' so that the active rectifier area is limited to the size of the opening. The insulating layer 18 may consist of a varnish coating or of paper. The stray capacitances of the column are proportional to the logarithm of the radius of the column and are linearly dependent upon the axial length of the column. It is of advantage therefore to keep the length of the column small. Thus, for example, the thickness of the carrier electrode 16 may be kept as small as feasible. Sufficient are aluminum electrodes of 0.2 mm. thickness.

For rectifying the acceleration high-voltage for television tubes, rod-type rectifiers as shown in FIG. 2 have been found well applicable with tablets having a total diameter of 4.5 mm. and an active-area diameter of 1.5 mm. As explained, it is essential for good performance of the rectifier column, and in view of the stray capacitances, that the rectifier tablets be subjected to a relatively high loading in the blocking direction. In practical use of the rectifying device in the manner shown in FIG. 3 and described hereinafter, the number of the tablets in the column was kept so low and consequently the blocking voltage per tablet so high (for example 50 v. per tablet) that the blocking losses at the operating frequency were approximately of the same magnitude, at least in the same order of magnitude, as the forward losses at normal forward current density, for example of 100 or a few 100 $\mu a./mm.^2$. Such an inverse load is unusually high. Nevertheless, or rather just for this reason, it has been found that the correspondingly designed and electrically loaded rectifier columns in high-voltage, high-frequency circuits (more than 5 kv. at more than 10 kc.) could be operated for a greatly prolonged period of time without occurrence of the otherwise always observable failures.

As shown in FIG. 3, the rectifier described with reference to FIG. 2 forms part of a circuit for producing the acceleration high-voltage for the cathode ray in the picture tube of a television receiver.

The portion 20 of the horizontal output transformer or horizontal scanning transformer furnishes an alternating voltage of about 10 to 20 kv. with a fundamental frequency of about 20 kHz. and a high share of upper harmonics, this alternating voltage being available for producing the acceleration direct voltage for the cathode ray. The voltage issuing from the transformer 20 is rectified by a rectifier 21 corresponding to the one shown in FIG. 2. The conical portion of the picture tube 22 is provided with an external conducting electrode coating 23 of annular shape and also with a corresponding inner conductive electrode 24 likewise of annular shape. The inner electrode 24 is connected to the positive direct-voltage terminal 25 of the rectifier 21. The outer electrode 23 and the incandescent cathode 26 of the electrode gun are grounded. The anode capacitance of the picture tube 22, that is the capacitance between the electrodes 23 and 24, serves as a smoothing capacitance for the electron-beam acceleration voltage.

We claim:

1. A high-voltage high-frequency rectifying circuit for suppressing the influence of stray capacitances upon the loading imposed upon the individual semiconductor rectifier members of a rectifier stack without the use of capacitative shielding, said rectifying circuit comprising voltage supply means having a voltage above 5 kv. and a frequency above 10 k.c.p.s., direct voltage terminals, and rectifier means connecting said voltage supply means to said terminals and comprising a column of semiconductor rectifier members stacked upon each other and having respective active rectifying areas amounting to $\frac{1}{100}$ to $\frac{1}{4}$ of their respective total surfaces, the number of said semiconductor rectifier members being so small that the blocking losses of said rectifier means are of substantially the same order of magnitude as the forward losses of said rectifier.

2. A high-voltage high-frequency rectifying circuit for suppressing the influence of stray capacitances upon the loading imposed upon the individual semiconductor rectifier tablets of a rectifier stack without the use of capacitative shielding, said rectifying circuit comprising a transformer having an output voltage of more than 5 kv. and a fundamental frequency above 10 k.c.p.s., direct current terminal means, and rectifier means comprising a column of selenium rectifier tablets serially in pressure contact with each other, said column being connected in series between said transformer and said terminal means, said tablets in said column having respective active rectifying areas amounting to a fraction between $\frac{1}{100}$ and $\frac{1}{4}$ of their respective total surfaces, and having a blocking voltage drop of approximately 50 v. per tablet, the number of said selenium tablets being so small that the blocking losses of said rectifier means are of substantially the same order of magnitude as the forward losses of said rectifier.

3. A high-voltage high-frequency rectifying circuit for providing acceleration voltage to electron-beam tubes and for suppressing the influence of stray capacitances upon the loading imposed upon the individual semiconductor rectifier tablets of a rectifier stack without the use of capacitative shielding, said rectifying circuit comprising a horizontal output transformer with a secondary winding having a voltage of more than 5 kv. and a frequency above 10 k.c.p.s., two output terminals between which said secondary winding is connected, one of said terminals being grounded, and rectifier means comprising a rod-shaped stack of selenium rectifier tablets series interposed between said other terminal and said winding, said selenium rectifier tablets having respective active rectifying areas amounting to a fraction between $1/100$ and $1/4$ of their respective total surfaces, the number of said selenium rectifier tablets being so small that the blocking losses of said rectifier means are of substantially the same order of magnitude as the forward losses of said rectifier.

References Cited

UNITED STATES PATENTS

| | | | |
|---|---|---|---|
| 3,170,218 | 2/1965 | Siebert | 317—241 X |
| 3,319,136 | 5/1967 | Perry et al. | 317—234 |
| 2,042,542 | 6/1936 | Masnou | 317—234 |
| 3,123,760 | 3/1964 | Wouk et al. | 321—11 |
| 3,128,421 | 4/1964 | Skellett | 321—11 |
| 3,242,412 | 3/1966 | Diebold | 321—11 |
| 3,278,826 | 10/1966 | Walker | 321—27 X |

OTHER REFERENCES

Vacuum Tube and Semiconductor Electronics, by J. Millman, pub. 1958, pp. 132–133.

JOHN F. COUCH, *Primary Examiner.*

G. GOLDBERG, *Assistant Examiner.*